United States Patent [19]

Bailey

[11] 4,007,246
[45] Feb. 8, 1977

[54] VARIABLE STRENGTH PLASTIC WRAP ON GLASS BOTTLES

[75] Inventor: Edward L. Bailey, Toledo, Ohio
[73] Assignee: Owens-Illinois, Inc., Toledo, Ohio
[22] Filed: June 9, 1975
[21] Appl. No.: 585,226
[52] U.S. Cl. ............................. 264/129; 264/230; 264/255; 264/259; 264/271; 264/309; 264/342 R
[51] Int. Cl.² ..................... B29C 27/00; B29D 3/00
[58] Field of Search .......... 264/230, 249, 321, 342, 264/126, 134, 342 R, 259, 255, 309, 271, 121, 125, 131, 134, 129; 156/85–86; 215/12 R; 427/27, 29, 30

[56] References Cited

UNITED STATES PATENTS

| | | | |
|---|---|---|---|
| 2,917,197 | 12/1959 | Glover et al. | 215/DIG. 6 |
| 3,178,049 | 4/1965 | Cottet | 215/DIG. 6 |
| 3,182,101 | 5/1965 | Rees | 260/897 B |
| 3,542,229 | 11/1970 | Waltenhofen | 156/86 |
| 3,604,584 | 9/1971 | Shank | 156/86 |
| 3,620,898 | 11/1971 | Harris | 156/85 |
| 3,698,586 | 10/1972 | Terner | 156/86 |
| 3,738,524 | 6/1973 | Richie | 215/12 R |
| 3,760,968 | 9/1973 | Amberg et al. | 156/86 |
| 3,823,213 | 7/1974 | Stastny et al. | 264/126 |
| 3,912,100 | 10/1975 | Graham et al. | 215/12 R |

FOREIGN PATENTS OR APPLICATIONS 724,484  12/1965  Canada ................. 215/13

Primary Examiner—Willard E. Hoag
Attorney, Agent, or Firm—John R. Nelson

[57] ABSTRACT

There is disclosed a composite container manufactured from a blown glass bottle for packaging product under pressure, such as beer or carbonated beverage. Combined with the glass bottle is a wrap or covering of an organic polymeric material or combination of materials, such as foamed polystyrene, foamed polyethylene, foam-film laminates, or film cured in place from a powder, overlying the exterior of the bottle. The covering or wrap is of variable strength along the axial extent of the bottle. The composite bottle has the thickest or the strongest section of wrap overlying the upper part of the bottle, including the neck and shoulder of the glass wall of the bottle such that the strongest section of the wrap encloses or surrounds that portion of the bottle in the vicinity of the "head space" in the filled package. The head space contains compressed gas released from carbonation in the product, and the gas is at substantial pressure. Should breakage of the glass occur, the fracture pattern frequently extends throughout the bottle and fragments around the "head space" region (neck and shoulder areas) are propelled by the greatest force and at the greatest velocity. In coating the upper part of the bottle surrounding the head space with the thickest or the strongest part of the annular covering, the fragments are satisfactorily contained for a given amount and cost of coating material utilized in the package. The invention provides better safety for given amounts of coating material to be employed.

10 Claims, 11 Drawing Figures

VARIABLE STRENGTH PLASTIC WRAP ON GLASS BOTTLES

The present invention relates to composite container articles; for example, a blow molded glass bottle and an over-wrap of a thermoplastic material, and method of making such articles. The invention provides an improvement in the composite container structure of the type disclosed in U.S. Pat. No. 3,760,968.

BACKGROUND OF THE INVENTION

Glass containers of the conventional type for packaging pressurized products like beer and carbonated beverages, will, upon fracture, propel fragments of the glass surrounding the "head space" region of the bottle with the greatest force and velocity. The "head space" is the volumetric portion of the bottle, in upright position, adjacent the shoulder and the neck portions of the glass wall of the glass bottle, and contains compressed gas escaping as carbonation from the beer or beverage product. The head space exists above the fluid level in the bottle and below the cap or closure on the bottle, and is surrounded by the glass wall in the neck portion. It has been found that fractures, fissures or cracks occurring in the glass wall away from the head space region will migrate in the glass wall to the neck and shoulder region at the head space, and with the significantly high pressures of the compressed gas being present, the rupture and fragmentation of the glass wall thereat is most prevalent and severe.

According to the present invention, it is one of the important objects to provide an exterior wrap, such as taught by the U.S. Pat. Nos. 3,760,968; 3,738,524 and 3,604,584, in which the plastic covering is purposely of a variable strength and assembled on the bottle so that the thicker or stronger section of the plastic wrap is matched to overlie the neck section or neck and shoulder sections of the glass wall and encircle the head space.

Another object of the invention is to provide such an overwrap of a foam thermoplastic material to obtain better cushioning and diminish breakage in the container, and, accordingly, achieve a safer pressure glass container.

A further object of the invention is to utilize organic polymeric materials that are economical to manufacture as the overwrap therefrom, and yet are readily and easily printed for label or decorative purposes and provide suitable properties in service for achieving the objectives alluded to herein.

In summary, the principal feature of the invention is to purposely vary the strength, or in most cases the thickness of the plastic wrap or functional coating on a glass bottle whereby the strongest portion of the overwrap on the bottle surface is characteristically along the upper part of the bottle and encircling the head space in the filled container. In the art, the term head space is the volume at the top of the bottle in upright position occurring above the liquid product (beer or beverage) and below the cap on the bottle. The head space contains the highest pressure concentration of gases in the bottle and, if fracture of the glass occurs, propels the fragments with the major force. The purpose of the invention is to improve overall safety of the bottle in use and do so at a practical cost. Data accumulated in practice indicates that breakage of the glass wall almost always includes fracture and fragmentation of the glass in the mentioned head space region.

The present invention is directed to upgrading the overall safety and retention of glass fragments propelled from the bottle should it break in service.

Other objects of the invention are to provide practical and economical methods of producing the overwrap of variable thickness along the axial extent on the bottle wall, as hereinafter are more specifically disclosed.

Several further objects and advantages of the invention will become apparent to those skilled in the art from the descriptions.

DETAILED DESCRIPTION OF THE DRAWINGS

Figure 1:
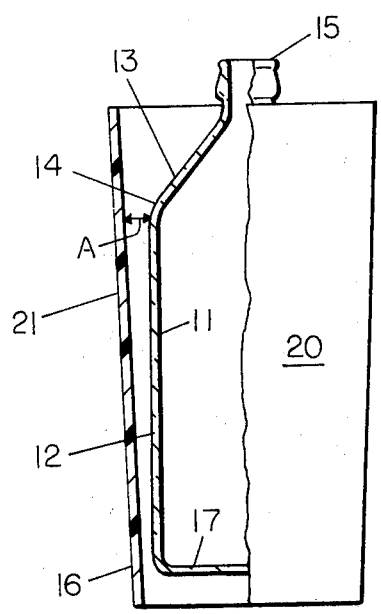
FIG. 1 is an elevational view, partly in section, of a first embodiment of the invention illustrating the step of encircling a glass bottle with a tapered sleeve of shrinkable, foamed polymeric material for providing the overwrap on the bottle wall.
Figure 2:
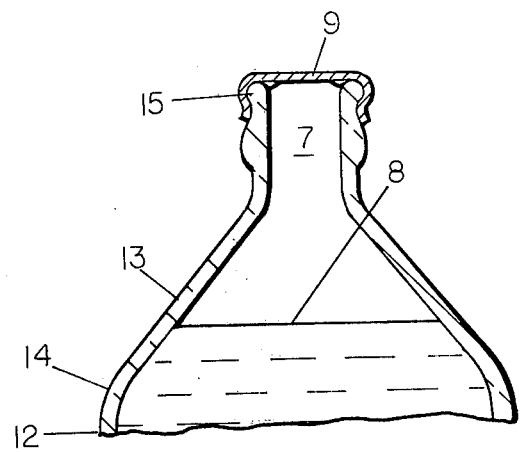
FIG. 2 is a sectional elevational view of the upper portion of a filled and capped conventional glass container for pressurized product (beer or carbonated beverages), illustrating the head space region in the upper portion of the filled bottle.
Figure 3:
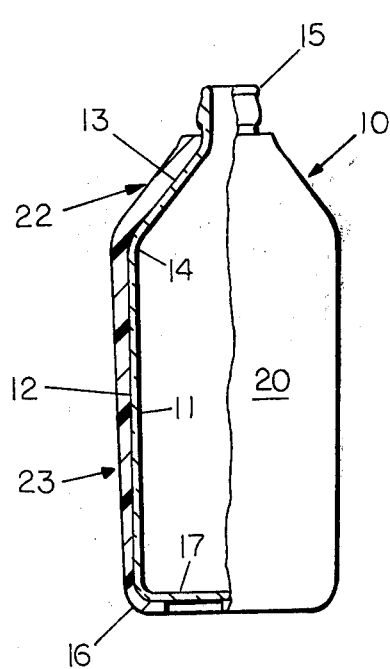
FIG. 3 is an elevational view, partly in section, showing the shrunken polymeric overwrap of FIG. 1 snugly encircling the bottle according to one embodiment of the present invention.

Referring to FIGS. 1–3 of the drawings, the first method and embodiment of the invention will be described.

FIRST METHOD

A conventionally manufactured bottle 10, such as a beer or beverage bottle manufactured in the IS flow process of present day manufacture, comprises a side wall 11 of glass that defines a larger diameter body section 12, a neck section 13 and the intermediate shoulder section 14. At the upper end of the neck section 13 there is formed a bottle finish 15 of the simple type used to apply a conventional crown closure 9 (shown by example on FIG. 2) and well known in the art. At the lower end of body 12 is a heel 16 which is a radius segment of the integral bottle wall that merges with the bottle bottom wall 17.

FIG. 2 illustrates, in section, approximately the upper half portion of a filled and capped beer or carbonated beverage container. The volume in the container above the liquid level or surface 8 and the underside of the cap 9 and surrounded by the wall of the neck section 13 of the bottle illustrates the head space volume 7, referred to herein. This volume or space, i.e. head space, is in the upright mode of the bottle, the volume of compressed gas that escapes from the carbonation of the product. If the bottle is placed in a horizontal attitude or sidewise mode, the gas migrates to an uppermost side volume along the body 12 of the bottle; however, in such mode the forces are more evenly distributed on the bottle wall. The most severe conditions of the compressed gas in the bottle is presented in the upright mode, it is believed, because of the frusto-conical or nozzle-like configuration of the neck at the head space region. It should be appreciated and readily understood, however, that the principles of the invention are equally applicable and attainable by those skilled in the art when directed to the safety of the container in dealing with the compressed gas volume in either of said modes or attitudes of the bottle.

Referring again to FIG. 1, a frusto-conical sleeve 20 of a heat-shrinkable, polymeric material is provided wherein the wall 21 of the sleeve is of substantially uniform thickness, as shown. In its preferred form, sleeve 20 may be made in accordance with the methods disclosed in U.S. Pat. No. 3,767,496, which by way of summary interest includes the following. An extrusion of the polymeric material is issued from an extruder die and the extrusion of material, in the form of a tube, is stretched in the machine direction (direction along the axis of extrusion) a major amount. Any stretching in the cross-direction is preferably kept to a minimum. As the stretching is being carried out in said machine direction, the tube is severed at its sides along more or less diametrical points thereof to form two webs of the material. The stretching in the higher temperature condition after extrusion places an orientation in the webs as formed. The material, upon reheating later, will shrink by a phenomenon of "memory" to provide a heat contractible characteristic to the material and shrinkage will occur most in the direction in the web of greatest orientation (stretch) which, in this example, is in the "machine direction".

The highly oriented web may be thereafter processed through a printing of one or both surfaces to provide a label or decoration image thereon, and next is sized to web widths for forming the sleeves 20. Sleeves 20 are formed from such webs by cutting lengths or pieces therefrom which are rolled or wrapped into frusto-conical, hollow form with the opposite ends or edges of the pieces overlapped and securely fastened at a seam by either heat fusion, adhesives or a combination of both.

The bottle 10 with encircling sleeve form of oriented polymeric material, as described and shown on FIG. 1, is heated, such as by conveying the assembly through a heat tunnel or oven. As disclosed in U.S. Pat. No. 3,767,496 aforesaid, it may be desirable to preheat bottle 10 to enhance shrinking action of sleeve onto the bottle 10. Experience has indicated that this is so in many applications. Oven temperature may vary; however, a range of 175°–800° will adequately shrink most of the polymeric materials which may be selected.

The final article, after shrinking the sleeve 20 thereon, is shown on FIG. 3 in which the overwrap on the bottle surface comprises an upper thickened and strengthened section 22 of the material overlying and exteriorly opposite the upper half portion of the glass wall of the bottle encircling with the thickened part the neck section 12 and shoulder section 14. The lower section 23 of the overwrap is thinner, as illustrated. In this embodiment, the variable wall thickness of the overwrap 20 is obtained by reason of the distance A over which the material in the wall of sleeve 20 has to shrink to contact the exterior of wall 12 of the bottle. The variable thickness of the material produces, accordingly, a variable strength of the wrap. As seen on FIG. 1, this distance A is a diminishing quantity from top to bottom of the sleeve. Also the variable distance A is greatest opposite neck section 13. It has been discovered in this method that with more overall surface area in the larger diameter segments at the upper part of the sleeve 20, there is a sum of more material in that area than in the bottom end where the diameter is less. Accordingly, there being more material there to begin with, the shrinking of sleeve 20 onto the bottle will deposit or result in more material on the bottle at the segment thereof contacted. Thusly, the surface coating on the bottle corresponding to the upper area 22 will be thicker and stronger than in the lower area 23. The purposes of the invention are fulfilled. The resultant product is a bottle in which the shrunken polymeric covering on the surface of the glass wall is thickest and strongest at or adjacent the head space 7 of the bottle.

SECOND METHOD

Figure 4:
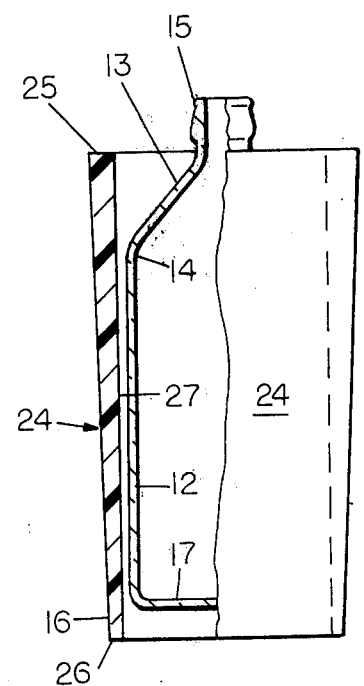
FIG. 4 is an elevational view, partly in section, of another embodiment of the invention illustrating the step of encircling the wall of a glass bottle with a cylindrical sleeve of shrinkable, foamed polymeric material and having a varying wall thickness.

The second method is illustrated on FIGS. 4 and 5, and this differs from the first method in the following particulars. A sleeve 24 of somewhat a cylindrical form is made from a special web of polymeric material that is oriented in a direction running circumferentially of the sleeve. This special web 24 is tapered in its thickness in a transverse direction to the machine direction such that the one (upper) edge 25 is thickest and the thickness dimension varies (tapers) to the other (lower) edge 26 whereat the material is thinnest. The spacing between the inner surface 27 of this sleeve and the body wall of bottle 10 is substantially uniform, i.e. the inner surface wall 27 of the sleeve is substantially parallel with outer surface of wall 12 of the bottle. In assembly, the thickest section of the sleeve 24 is placed opposite the neck section of the bottle which is encircling the head space 7. Next the sleeve and bottle are heated in an oven, as previously described in the first method, and the sleeve 24 shrinks into snug surface engagement with the bottle to produce a container shown on FIG. 5.

Figure 5:
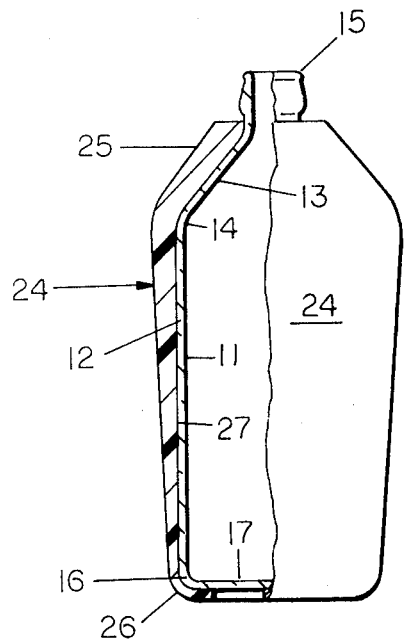
FIG. 5 is an elevational view, like FIG. 3, that is partly broken away and in section, showing the shrunken polymeric overwrap encircling the bottle according to the embodiment of FIG. 4.

In FIG. 5, the exterior wrap 24 on the bottle provides an exterior cover member that encircles the wall sections 14, 12, 16 and at the extremities a portion of 13 and 17 of the bottle. The variable thickness and resultant strength of cover member 24 is variable along the axis of the bottle and the maximum thickness region 25 thereof is disposed in an overlying relationship to the neck section 13 of the bottle, and encircling the head space 7. Under the invention, the axial extent of coverage of plastic cover member 24 may be varied so long as the strongest section of member 24 is matched to overlie the upper half portion of bottle 10.

THIRD METHOD

As an alternative, this third method provides a different sleeve 30 of the shrinkable polymeric material that is highly oriented in the machine direction (circumferential dimension of sleeve 30). The sleeve 30 is made from a first long sleeve ply 32 of uniform wall thickness and superimposed over the upper portion of the long ply 32 is a second shorter ply 31 of the same material. The concentric plies in sleeve 30 is thickest and strongest at the upper half of the bottle and thinnest at the lower half of the bottle.

Figure 6:
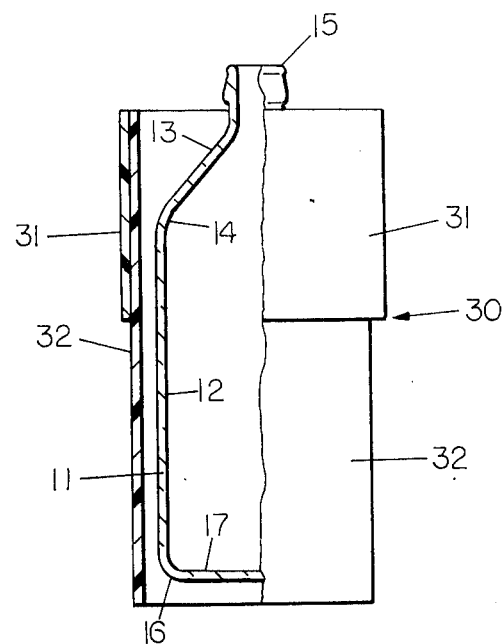
FIG. 6 is an elevational view, partly in section, of a further embodiment of the invention illustrating the step of encircling the glass bottle with a cylindrical composite sleeve of a foamed, shrinkable polymeric material, the composite sleeve having a first long ply of substantially uniform thickness and reinforced in the upper axial portion for the bottle with a second short ply of a similar material as an overlay telescopically arranged with the first ply of the sleeve.

In the process, sleeve 30 is assembled over the bottle surface substantially as shown on FIG. 6 and then heated in an oven, as previously described in the first and second methods, such that sleeve 30, (both plies) shrinks into snug, conforming relationship over nearly the entire exterior surface of the bottle 10. This method produces a container as shown on FIG. 7.

Figure 7:
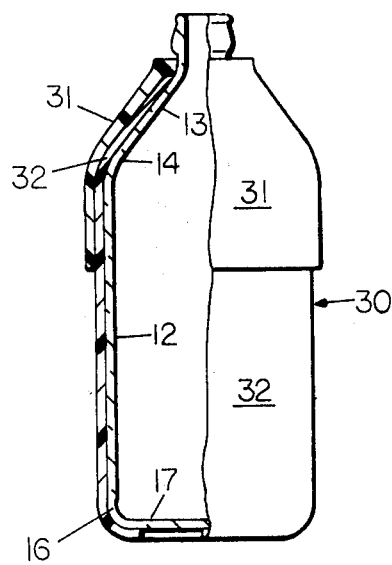
FIG. 7 is an elevational view that is partly broken away and in section, showing the shrunken polymeric overwrap encircling the bottle according to the embodiment of FIG. 6.

The container of FIG. 7 includes the exterior wrap of the sleeve 30 comprised of the stronger, thicker, upper, two-ply portion at 31, which is superimposed and shrunken to cover shoulder 14 and neck 13 of the bottle. The lower single ply portion of the sleeve 30 overlies the balance of body section 12, heel 16 and a part of the bottom 17 of bottle 10.

A further selective feature of the sleeve 30 of this embodiment should be noted. This form of wrap sleeve may be comprised as a laminate of different materials; for example only, the one ply portion 31 may be foamed polyethylene material, whereas the long ply portion 32 may be foamed polystyrene material. Under circumstances such as this, using two different strength materials, thickness is not necessarily in direct proportion to strength and vice versa. Another variant which may be employed is to make the two plies 31, 32 of different thickness; for example, the ply 32 may be of a caliper that is 0.011 inch in thickness and the upper ply 31 may be of the order of 0.005 inch thickness, which is desirable from the standpoint of cost reduction, but with high yield benefits of the invention. A further variation may be provided in making the long ply 32 of a foamed material and of the major thickness in the laminate, and the outer ply 31 of a solid (non-foamed) film. The plies 31 and 32 may be of the same material or of different materials, e.g. both of a polystyrene compound — one foam and one film — or different compounds. To those skilled in the art, various and further combinations of materials and constructions of the laminate plies should be readily apparent to those skilled in the art who may wish to meet particular needs of the package under use.

FOURTH METHOD

Figure 8:
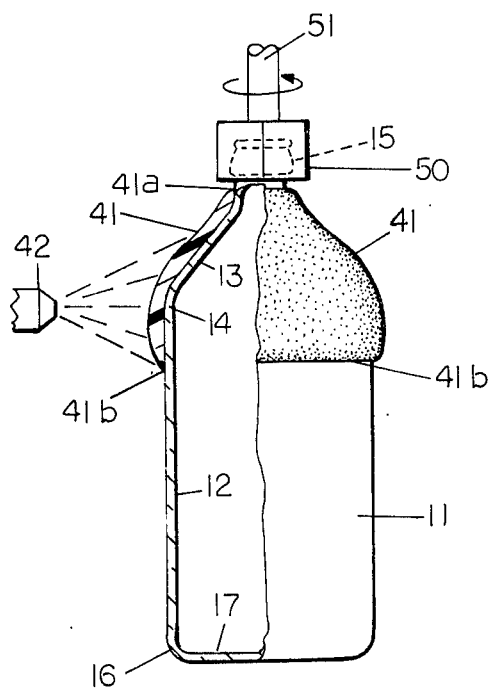
FIG. 8 is an elevational view, partly in section, of a still further embodiment of the invention illustrating the step of applying a layer of a powder sprayed annular segment of functional coating of polymeric material over the upper half portion of the upright bottle, which is next cured by heat treatment (not shown).
Figure 9:
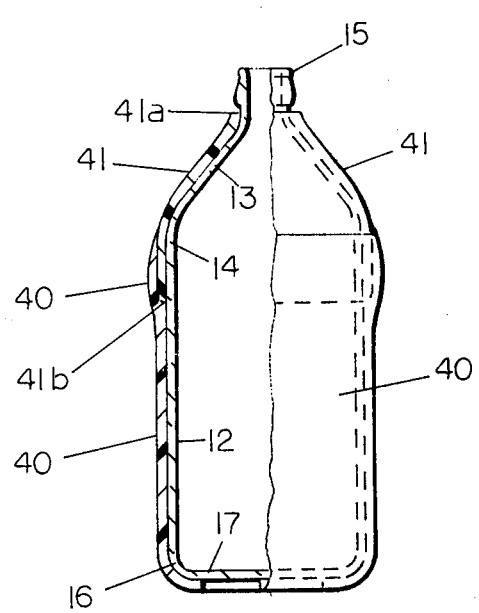
FIG. 9 is an elevational view, partly broken away and in section, illustrating the subsequent step of the embodiment of FIG. 8, in which the lower portion of the bottle and the lower margin of the cured powder-sprayed layer is encircled with a cylindrical sleeve of a shrinkable, polymeric material of essentially uniform wall thickness and heat shrunken into snug fitting engagement on the bottle. This drawing illustrates the final wrapped bottle of this embodiment.

A fourth method is illustrated on FIG. 8. In this form of the invention, the bottle 10 is provided with a layer 41 of powdered polymeric material applied over the upper half of the bottle to overlie at least the shoulder section 14 and the neck section 13 of the bottle wall surrounding the normal head space 7; and, as shown, may be feathered over the upper adjacent region of the body wall 12. The coverage is annular and the powdered material is applied from a spray nozzle 42 while the bottle 10 is supported by a neck chuck 50 that is rotated by its spindle shaft 51 relative to spray nozzle 42. After the selected thickness of powdered material is laid over the glass exterior surface, the coated bottle is placed in an oven operated at sufficient temperature to fuse the powdered plastic material into a film and provide the strength reinforcement segment of the cover member, indicated as 41, in achieving the embodiment of the invention, as described hereinafter. Next, a cylindrical sleeve 40 of shrinkable polymeric material having a substantially uniform wall thickness is telescopically applied. Sleeve 40, which is in a cylindrical form and highly oriented circumferentially, is assembled telescopically in place annularly along the wall sections 14, 12 and 16 of bottle 10; whereupon, sleeve 40 and bottle 10 are heated in an oven to suitably shrink the sleeve into a snug, conforming, surface engagement on the exterior surface of the bottle over the sections thereof providing coverage for shoulder 14, body 12 and heel 16 and a portion of neck 13, at the one end, and a portion of bottom 17 at the other end of the cover member, as shown on FIG. 9.

Figure 10:
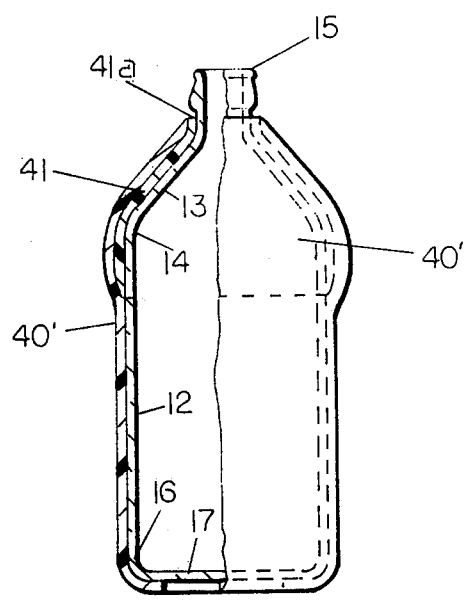
FIG. 10 is an elevational view, partly broken away and in section, but illustrating a variation of the embodiment of FIG. 9, in which a long sleeve of the shrinkable, polymeric material is employed, extending along the bottle to overlie the spray coated portion in the upper half of the bottle as well as the lower half of the bottle.

A further variant of the coated container produced by this method is illustrated on FIG. 10. First, the glass bottle 10 is spray coated with the powdered material in the same manner as above described for FIG. 9, and thereafter heated sufficiently to fuse this coating layer 41 into a film. Next, a long cylindrical sleeve 40' of the oriented, shrinkable, polymeric material of substantially uniform thickness is assembled telescopically over the bottle. The top of sleeve 40' is placed to approximately the same height or elevation as the top edge 41a of the fused powder coating 41, and the lower edge of sleeve 40' extends below the heel radius 16 of the bottle. The assembled sleeve and bottle are next heated in an oven to suitably shrink the long sleeve into a snug, conforming fit over the exterior surface of the bottle such that the sleeve 40' extends from the mentioned height at edge 41a overlying all of the fused powder coating 41 on the neck 13 and shoulder 14 of the bottle and over the surface in the body 12, heel 16 and a portion of the bottom 17 thereof. This form of the coated bottle is shown on FIG. 10.

Either form or variant of this method (FIGS. 9 and 10) provides for substantial encapsulation of the glass bottle with the two part plastic covering.

FIFTH METHOD

Figure 11:
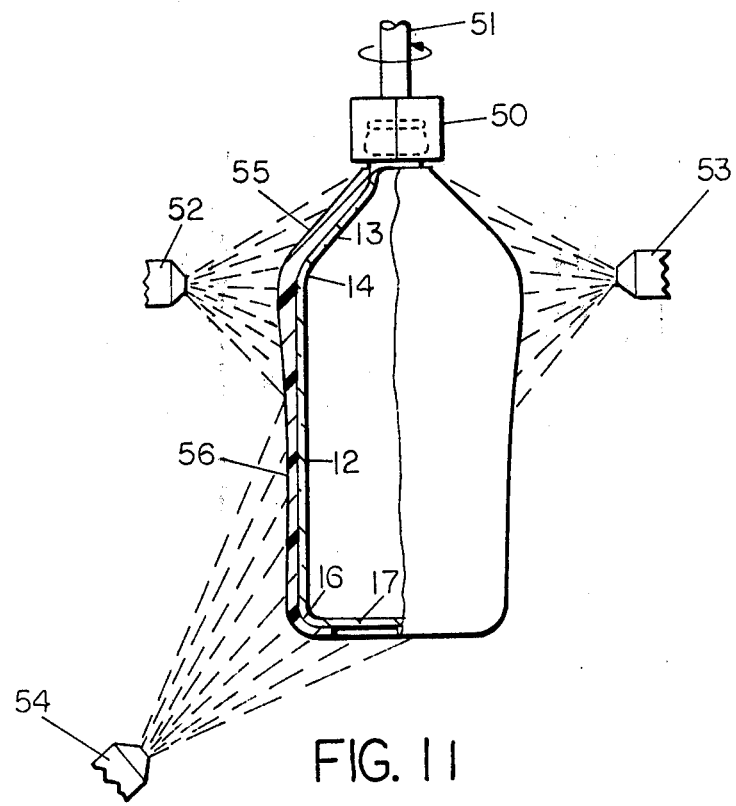
FIG. 11 is an elevational view, partly broken away and in section, and in part schematic, illustrating still another embodiment of the invention in which the upper and lower half portions, or nearly so, of the bottle are simultaneously spray coated with a powder of a functional coating material — a polymeric material — applied such that the upper half portion of the bottle receives a substantially thicker annular coating layer than does the lower half portion of the bottle, which coating is subsequently cured and fused by a heating step (not shown).

The fifth method of the invention is shown on FIG. 11. In this form of the invention, the bottle is held in a neck chuck 50 and rotated by its spindle shaft 51. The upper half portion of the bottle is covered by a powder spray of a polymeric material directed against the shoulder 14 and neck 13 from two nozzles 52 and 53. The lower half portion of the bottle is covered by the powdered material spray emanating from a single lower nozzle 54. The single lower nozzle 54 is focused such that the spray pattern merges with or slightly overlaps the spray pattern of powder from nozzles 52 and 53 at the bottom margin of that upper half coating and covers the remainder of body 12, heel 16 and all of the bottom 17 of the bottle. The feed of the material sprayed from the two upper nozzles 52 and 53 is regulated such that the amount of material sprayed produces a thicker coating layer in the shoulder 14, neck 13 area than the layer 56 in the body 12, heel 16 and bottom 17 area produced by the single lower nozzle 54. The lower coating 56 should be substantially uniform in thickness as best may be obtained from the spray equipment used. The upper coating 55 may be varied in thickness for blending the layers and maintaining best appearance of the bottle. Referring to the thicker portions of the two surface coating areas 55 and 56, the ratio of thicknesses being at least 1.2 to 1, and the ratio found to work satisfactorily is on the order of 1.4 to 1, comparing coating 55 to coating 56.

After coatings 55 and 56 are sprayed, preferably simultaneously, the bottle is placed in an oven and sufficiently heated to fuse and cure the powdered plastic material into a contiguous, encapsulating, variable thickness and strength layer of film over the bottle, and achieves the objectives of the invention mentioned herein.

Those skilled in the art will readily appreciate that spray equipment may be obtained which produces variable volume or quantity of the powdered material; and, therefore, it should be apparent that the FIG. 11 embodiment may be operated with but one upper nozzle, such as 52, that is capable of spraying the material of greater volume than the lower nozzle 54 and thereby achieve the same desired coating of variable thickness described above.

Some preferred examples of the coated bottles produced in accordance with the invention are set forth hereinafter.

POLYMERIC MATERIAL
EXAMPLES

The following are examples of preferred materials for use in making the sleeve-cover member under the present invention.

A. A foamed polystyrene sheet product is prepared from extruxion of a particulate polystyrene containing a foaming agent comprised of about 6–8% pentane and nucleators, e.g. ½% sodium bicarbonate and ½% citric acid. The annular (tubular) extrusion is sliced at the sides into flat webs and highly oriented in the machine direction. The webs are printed in flat form and again sliced, along the machine direction, into finished webs of the pre-printed material. From this, the several sleeve wraps are made in accordance with the one of the methods described herein. The foamed polystyrene is preferably made in caliper to a thickness on the order of 0.010 to 0.020 inches. The bulk density of the material is on the order of 10–18 lb. per cubic foot.

B. A foamed polyethylene sheet product is prepared from extrusion of a particulate polyethylene. The extrusion is formed to webs, pre-printed and sized to individual ribbons or webs, as described in Example A, above. The material is preferably made of a caliper in the range of 0.008 – 0.020 inches in thickness. The bulk density of the material is on the order of 10–18 lb. per cubic foot.

C. The foamed polystyrene product of Example A, above, is co-extruded with a polyethylene that is formed as a film on one surface of the foamed polystyrene and suitably attached or bonded as a polystyrene foam-polyethylene film laminate. The overall thickness should be on the order of 0.010 – 0.020 inches, one such laminate combination being a thickness of a film of 0.005 inches and a polystyrene foam of 0.011 inches.

D. The example of C, above, is followed in forming a film-foam laminate if polyethylene film and a polyethylene foam. These may be fabricated as co-extrusions or by other means known to those skilled in the art. The material may exhibit slightly greater strength and, therefore, a working example is a laminate, in thicknesses of 0.005 inch polyethylene film combined with a 0.008 inch polyethylene foam. The crush resistance of this latter example may not compare favorably with Example C, in which case a slightly thicker foam lamina may be desirable, say 0.010 to 0.011 inch thickness.

E. The bottle prepared in accordance with Method Four, described above, is treated in the initial step by spraying a powdered Surlyn (copolymer of carboxylic acid containing monomers with ethylene) material onto the bottle (see FIG. 8). Upon curing the powder sprayed compound by heat, the particulate of the sprayed layer fuses into a film coating that may be transparent, if desired, or semi-opaque, depending upon the requirement of the package. The contractible sleeve of oriented polymeric material is then placed on the bottle and heat shrunken, such as one of the forms shown on either FIGS. 9 or 10. The contractible sleeve for either form of this bottle has a straight sided thickness distribution on the order of 0.015 inch and the sprayed Surlyn powder, when fused to a film, will provide an additional coverage of 0.003 to 0.008 inch thickness at the neck and shoulder sections of the bottle.

F. The bottle prepared in accordance with Method Five, descirbed above (see FIG. 11), is sprayed in the upper and lower half regions with powdered Surlyn material (copolymer of carboxylic acid containing monomers with ethylene). After spraying, the powder layer is fused and cured into a film coating which may be transparent, translucent or opaque, as desired in the package design, by controlling the pigment and coloration of the powder compound. The upper coating portion 55 of this embodiment may be coated on the order of 0.005–0.010 and the lower coating portion 56 is coated on the order of 0.003–0.005. The ratio of thicknesses of the upper coating compared to lower coating portions should be at least 1.2 to 1 and the preferred ratio of thickness of coating on the two bottle portions is, by this example, 1.4 (upper coating) to 1.0 (lower coating). Of course, the amount of coating will depend upon the degree of protection to be afforded the package and overall cost limitations. The example given exhibits very good glass fragment retention upon fracture or breakage of the filled and capped glass bottle under pressure packaging situations.

Other examples of thermoplastic materials, which are polymeric in nature, suitable for the sleeves are polypropylene, cellulose propionate, cellulose butyrate, cellulose butyrate acetate, polyvinyl chloride, cellulose acetate, polyamides and polyurethanes. These are but some of the many available polymeric compositions of heat shrinkable materials available in film or sheet. Many of these examples are available in pre-foam stock.

The various embodiments disclosed for the invention provide added safety in the use of frangible containers, such as glass bottles, in the packaging of product under positive pressure and, in some cases, under vacuum (negative pressure).

Other and further modifications and variants of the invention should occur to those skilled in the art and which can be effected within the spirit and scope of the invention, as described herein, and as defined in the appended claims.

What is claimed:
1. The method of enhancing the fragment retention of a glass container having a neck wall section encircling a head space portion of the container when filled and in upright position comprising the steps of:
    a. encircling the exterior surface of the container with a preformed sleeve of a heat shrinkable, polymeric material, the encircled exterior surface including said neck wall section thereof, and
    b. heat shrinking said encircling sleeve about the container to provide a polymeric exterior layer of said material of variable thickness, the maximum thickness of said exterior layer overlying the said neck wall section of the container; and
    c. the outer surface of the sleeve before shrinking comprising a frusto-conical surface having a major outside diameter and minor outside diameter, said major outside diameter thereof being located opposite the neck wall section of the container, and the shrinking step causing the material adjacent said major outside diameter to form a thicker exterior layer of the material overlying the neck wall section of the container than the remainder of the layer thereon.

2. The method of claim 1, wherein the frusto-conical sleeve has a substantially uniform wall thickness prior to heat shrinking.
3. The method of claim 1, wherein the glass container includes integral bottom, body, shoulder and neck portions formed by said glass wall and the neck wall section thereof is in encircling relation to said head space portion of the container, the maximum thickness portion of the sleeve being disposed opposite said neck wall section of the container, the heat shrinking step causing the sleeve in said maximum portion to form a thickened exterior layer of the polymeric material overlying the neck wall of the container.
4. The method of claim 1 including the following added steps performed before said encircling step:
    a. forming a layer of a polymeric material on an exterior surface of said container wall about said head space portion; and
    b. heating said layer of polymeric material in situ to form a film layer thereon of said material.
5. The method of claim 4, wherein the second layer encircles substantially all of the film layer on the bottle.
6. The method of claim 4, wherein the formation of the film layer of polymeric material comprises spraying a powdered thermoplastic material in an annular formation overlying the head space portion of the bottle, and heating the annular powdered layer to fuse and cure the powdered material to a film thereon.
7. The method of reinforcing a glass container having a head space portion, comprising:
    a. forming a substantially cylinderical sleeve having two open ends, from heat shrinkable thermoplastic material, said material being tapered in thickness from one end of said sleeve to the other of said ends;
    b. disposing said sleeve about a glass container with the thicker end disposed adjacent said head-space portion of said container and said thinner end adjacent a body portion of said container;
    c. heating said sleeve to shrink said material about said container.
8. The method of claim 7, wherein the polymeric material comprises a cellular thermoplastic.
9. The method of claim 8, wherein the cellular thermoplastic is selected from the group consisting of polystyrene and polyethylene, the cellular formation of the sleeve wall, prior to heat shrinking thereof, being selected in the range of 0.008 – 0.020 inches in thickness.
10. The method of claim 1 with the added steps of
    a. spraying an annular layer of powder polymeric material onto neck wall portion of the container,
    b. heating said powder to form a film layer in situ on the container, before said encircling step.

* * * * *